United States Patent Office 2,946,771
Patented July 26, 1960

2,946,771

PRODUCTION OF POLYAMIDES

Denis George Harold Ballard, Holyport, near Maidenhead, Clement Henry Bamford, Beaconsfield, William Edward Hanby, Oaken Grove, Maidenhead, and Frederick John Weymouth, Styvechale, Coventry, England, assignors to Courtaulds Limited, London, England, a British company No Drawing. Filed Jan. 22, 1958, Ser. No. 710,425

Claims priority, application Great Britain Feb. 22, 1955

5 Claims. (Cl. 260—77.5)

This invention relates to the production of polyamides. This application is a continuation-in-part application of our application No. 563,203 filed Feb. 3, 1956, now abandoned.

This invention is particularly concerned with the production of synthetic polypeptides by polymerising anhydrocarboxyamino-acids having the general formula

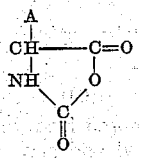

A being an alkyl or aralkyl group, which may be substituted with an inactive substituent group such as an ester group. Examples of suitable anhydrocarboxyamino acids are as follows, the A group being indicated in brackets:

The anhydrocarboxyamino acid of gamma-benzyl-L-glutamate ($C_6H_5$—$CH_2$—O—OC—$CH_2$—$CH_2$—), of DL-beta-phenyl-alanine ($C_6H_5$—$CH_2$—), or D,L and DL-alanine (—$CH_3$), of gamma-methyl-L-glutamate ($CH_3$—O—OC—$CH_2$—$CH_2$—), of leucine

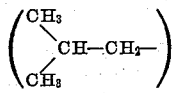

of isoleucine

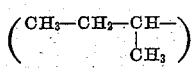

of norleucine ($CH_3$—$CH_2$—$CH_2$—$CH_2$—), of epsilon-N carboxy-benzoxy lysine ($C_6H_5$—$CH_2$—O—OC—NH—$CH_2$—$CH_2$—$CH_2$—$CH_2$—), of ortho-acetyl tyrosine

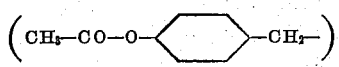

and also alpha-amino-N-butyric-anhydrocarboxy amino acid ($CH_3$—$CH_2$—$CH_2$—).

The term "polypeptide" as used in this specification means a polyamide built up with a recurrent

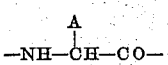

group, and obtained by polymerising an anhydrocarboxyamino-acid having a formula defined above.

It is known that anhydrocarboxyamino-acids can be polymerised by heating, either alone or in the presence of certain catalysts, the polymerisation being accompanied by the evolution of carbon dioxide. The catalysts generally proposed hitherto are water and compounds of the type XH in which H is an active hydrogen atom and X is R—NH— or

where R, $R_1$ and $R_2$ are alkyl or aryl radicals, or $R_3$—O— where $R_3$ is an aryl radical, such compounds being primary amines, secondary amines or phenols. Acids having an ionization constant at 25° C., in the range $2.25 \times 10^{-3}$ to $6 \times 10^{-7}$ may also be used. It has also been proposed in British patent specification No. 653,597 to use as catalysts the sodium or potassium salt of an alpha-aminocarboxylic acid.

The object of this invention is to promote rapid polymerisation of anhydrocarboxyamino-acids.

In accordance with the present invention the polymerization of one or more anhydrocarboxy-amino-acids is effected in solution in the presence of a mono-carboxylic acid salt having the general formula $(R.COO^-)_n \, X^{n+}$ in which $R.COO^-$ is the anion of a mono-carboxylic acid having a dissociation constant of less than $2 \times 10^{-3}$, R is an alkyl, aryl or aralkyl group and $X^{n+}$ is the cation of an alkali metal, an alkaline earth metal or an alkyl tertiary base, $n$ representing the valency of the cation. Preferred examples of such salts are potassium acetate, sodium acetate, sodium phenyl acetate, potassium or sodium benzoate, and tri-n-butyl-amine acetate. Other examples of suitable salts are sodium and potassium propionates, butyrates and dihydroxy cinnamates; tri-normal-butyl amine propionate and butyrate; lithium acetate, propionate and butyrate; calcium and strontium acetates, propionates, butyrates and benzoates; sodium and potassium naphthalates and sodium and potassium ortho-, meta-, and para-toluates. The metal salts may be added to the anhydrocarboxylamino-acid as a fine dispersion or in solution for example in N-methyl formamide.

The polymerisation of the anhydrocarboxyamino-acid is effected in solution. Suitable solvents are benzene, nitrobenzene, chlorbenzene, acetophenone, dioxane, methylene chloride, chloroform, dimethyl formamide and mixtures of these compounds, the actual choice of solvent depending on the solubility properties of the original anhydrocarboxyamino-acid or acids and the resulting polypeptide. The polymerisation can be carried out at varying temperatures; temperatures ranging from 0° to 100° C. have been used successfully. For economic reasons it is preferred to carry out the polymerisation at ordinary temperatures.

The invention is illustrated by the following examples in which parts are by weight.

Example 1

5 parts of the N-carbonic anhydride of γ-benzyl-L-glutamate were dissolved in a mixture of 35 parts of nitrobenzene and 70 parts of dioxane. A solution of 0.025 part of potassium acetate (1.32 mol percent based on the weight of the anhydride) in 1 part of N-methyl formamide was added with stirring. The resultant solution was stirred for 2 hours at 25° C. in an evacuated container while a rapid evolution of carbon dioxide occurred. The polymer was precipitated by the addition of 2000 parts of ether.

The product obtained was a colourless fibre-forming polymer; its reduced viscosity in dichloracetic acid was 0.97. In these examples reduced viscosity is defined as $$\frac{\eta sp}{c}$$

in which $\eta sp$ is the specific viscosity of a solution having a concentration ($c$) of 0.5 gram per 100 cc.

Example 2

5 parts of the N-carbonic anhydride of γ-benzyl-L-glutamate were dissolved in 100 parts of dioxane and a solution of 0.04 part of sodium phenyl acetate (1.32 mol percent based on the weight of the anhydride) dissolved in 1 part of N-methyl formamide was added with stirring. After the solution had been stirred for 2 hours at 25° C. in an evacuated container, the polymer was precipitated by adding ether as in Example 1.

The product obtained was a colourless fibre-forming polymer; its reduced viscosity in dichloracetic acid was 1.85.

Example 3

The procedure described in Example 1 was repeated with the only exception that the potassium acetate was replaced by its molar equivalent (0.035 part) of sodium benzoate. A similar type of polymer to that of Example 1 was obtained, its reduced viscosity being 0.90.

Example 4

5 parts of the N-carbonic anhydride of γ-benzyl-L-glutamate were dissolved in 100 parts of dioxane and a solution of 0.015 part of acetic acid and 0.046 part of tri-n-butyl-amine in 1 part of dioxane was added with stirring. The solution was stirred for 16 hours at 25° C. in an evacuated vessel. The polymer was precipitated as in Example 1.

The product obtained was a colourless fibre-forming polymer; its reduced viscosity in dichloracetic acid was 1.64.

Example 5

3 parts of the N-carbonic anhydride of DL-β-phenyl-alanine were dissolved in 130 parts of nitrobenzene and a solution of 0.05 part of potassium acetate (3.3 mol percent based on the weight of the anhydride) in 5 parts of N-methyl formamide was added with stirring. The solution was allowed to stand for 16 hours in a closed vessel at 25° C. and the product was then precipitated by adding 500 parts of ether.

The product obtained had a reduced viscosity in dichloracetic acid of 0.29.

Example 6

50 grams of the N-carbonic anhydride of D-alanine were dissolved in a litre of a mixed solvent consisting of equal volumes of N-N-dimethyl formamide and nitrobenzene. 0.36 gram of sodium acetate was then added with stirring and the mixture was allowed to stand for 16 hours.

The polymer was precipitated with ether, filtered, washed with ether and dried. The polymer was then washed with water to remove the initiator and redried. The yield was 85 percent. The reduced viscosity of the polymer in trifluoracetic acid was 0.66.

Examples 7–13

The procedure described in Example 6 was repeated using amounts of initiator given in the table below: the table also includes the reduced viscosity of the polymer measured in trifluoracetic acid.

| Example No. | Catalyst | Reduced Viscosity |
|---|---|---|
| 7 | 0.72 g. of sodium acetate | 0.10 |
| 8 | 1.23 g. of potassium acetate | 0.08 |
| 9 | 0.86 g. of potassium acetate | 0.10 |
| 10 | 0.43 g. of potassium acetate | 0.12 |
| 11 | 3.44 g. of calcium acetate | 0.08 |
| 12 | 0.69 g. of calcium acetate | 0.14 |
| 13 | 0.34 g. of calcium acetate | 0.11 |

The yields in these examples varied from 80–85 percent.

What we claim is:

1. A process for the production of polyamides comprising dissolving in a solvent chosen from the group consisting of benzene, nitrobenzene, chlorobenzene, acetophenone, dioxane, methylene chloride, chloroform, dimethyl formamide, and mixtures of these compounds, at least one anhydrocarboxyamino acid having the general formula:

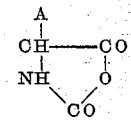

where A is a radical chosen from the group consisting of alkyl, aralkyl, and alkyl and aryl groups substituted by an ester group, and, as polymerisation initiator, a monocarboxylic acid salt having the general formula $(R.COO^-)_n X^{n+}$ in which $R.COO^-$ is the anion of a monocarboxylic acid having a dissociation constant of less than $2 \times 10^{-3}$, R is a radical chosen from the group consisting of alkyl, aryl and aralkyl groups, $X^{n+}$ is the cation of a radical chosen from the group consisting of the alkali metals, alkaline earth metals and alkyl teritary bases and n is a number equal to the valency of the cation, and maintaining the temperature of the resultant solution at 0° C. to 100° C. whereby carbon dioxide is evolved and polymerisation of the anhydrocarboxyamino acid is effected.

2. A process as claimed in claim 1 in which the monocarboxylic acid salt used is potassium acetate.

3. A process as claimed in claim 1 in which the monocarboxylic acid salt used is sodium phenyl acetate.

4. A process as claimed in claim 1 in which the monocarboxylic acid salt used is sodium benzoate.

5. A process as claimed in claim 1 in which the monocarboxylic acid salt used is tri-*n*-butylamine acetate.

No references cited.

UNITED STATES PATENT OFFICE

CERTIFICATION OF CORRECTION

Patent No. 2,946,771                                                 July 26, 1960

Denis George Harold Ballard et al.

It is hereby certified that error appears in the above numbered patent requiring correction and that the said Letters Patent should read as corrected below.

Column 4, line 34, for "an ester group" read -- a group selected from the class consisting of the $C_6H_5CH_2OOC-$ and $CH_3OOC-$ groups --.

Signed and sealed this 2nd day of May 1961.

(SEAL)
Attest:

ERNEST W. SWIDER                                            DAVID L. LADD
Attesting Officer                                                Commissioner of Patents